(12) United States Patent
Lee

(10) Patent No.: US 7,881,723 B2
(45) Date of Patent: Feb. 1, 2011

(54) METHOD FOR CONTROLLING VOICE GAIN IN A COMMUNICATION TERMINAL AND APPARATUS OF ENABLING THE METHOD

(75) Inventor: Byung Yo Lee, Seoul (KR)

(73) Assignee: SKY Teletech Co., Ltd., Seoul (KR)

( * ) Notice: Subject to any disclaimer, the term of this patent is extended or adjusted under 35 U.S.C. 154(b) by 1107 days.

(21) Appl. No.: 11/285,960

(22) Filed: Nov. 23, 2005

(65) Prior Publication Data

US 2006/0111094 A1      May 25, 2006

(30) Foreign Application Priority Data

Nov. 23, 2004    (KR) ...................... 10-2004-0096090

(51) Int. Cl.
*H04W 72/00* (2009.01)
(52) U.S. Cl. .................... 455/452.1; 370/229; 370/230; 370/230.1; 370/231; 370/232; 455/450; 455/451; 455/452.2
(58) Field of Classification Search ................. 370/229, 370/230, 230.1, 231, 232; 455/450, 451, 455/452.1, 452.2
See application file for complete search history.

(56) References Cited

U.S. PATENT DOCUMENTS

| | | | |
|---|---|---|---|
| 6,778,556 B1 * | 8/2004 | Chin et al. .................. | 370/468 |
| 7,047,310 B2 * | 5/2006 | Bedekar et al. ............. | 709/232 |
| 2002/0067694 A1 * | 6/2002 | Cheng et al. ................ | 370/230 |
| 2002/0173313 A1 * | 11/2002 | Hutcheson et al. .......... | 455/453 |
| 2002/0191570 A1 * | 12/2002 | Kim et al. .................... | 370/335 |
| 2003/0043773 A1 * | 3/2003 | Chang ......................... | 370/338 |
| 2005/0026568 A1 * | 2/2005 | Hawker et al. ................ | 455/70 |
| 2005/0117516 A1 * | 6/2005 | Yang ........................... | 370/232 |
| 2005/0201280 A1 * | 9/2005 | Lundby et al. .............. | 370/229 |
| 2005/0282590 A1 * | 12/2005 | Haparnas .................... | 455/570 |

FOREIGN PATENT DOCUMENTS

| | | |
|---|---|---|
| JP | 2004-242050 | 8/2004 |
| KR | 10-1996-0009552 A | 3/1996 |

\* cited by examiner

*Primary Examiner*—Rafael Pérez-Gutiérrez
*Assistant Examiner*—Liton Miah
(74) *Attorney, Agent, or Firm*—H.C. Park & Associates, PLC

(57) ABSTRACT

Disclosed are a method for automatically controlling volume so that sending volume and receiving volume are equal in accordance with a communication network accessed at a communication terminal, and an apparatus for performing the method. The present invention receives communication information from an accessed base station in a mobile communication terminal and automatically adjusts volume to make sending volume and receiving volume equal in accordance with the received communication information. Accordingly, a user does not need to do anything to control volume.

11 Claims, 9 Drawing Sheets

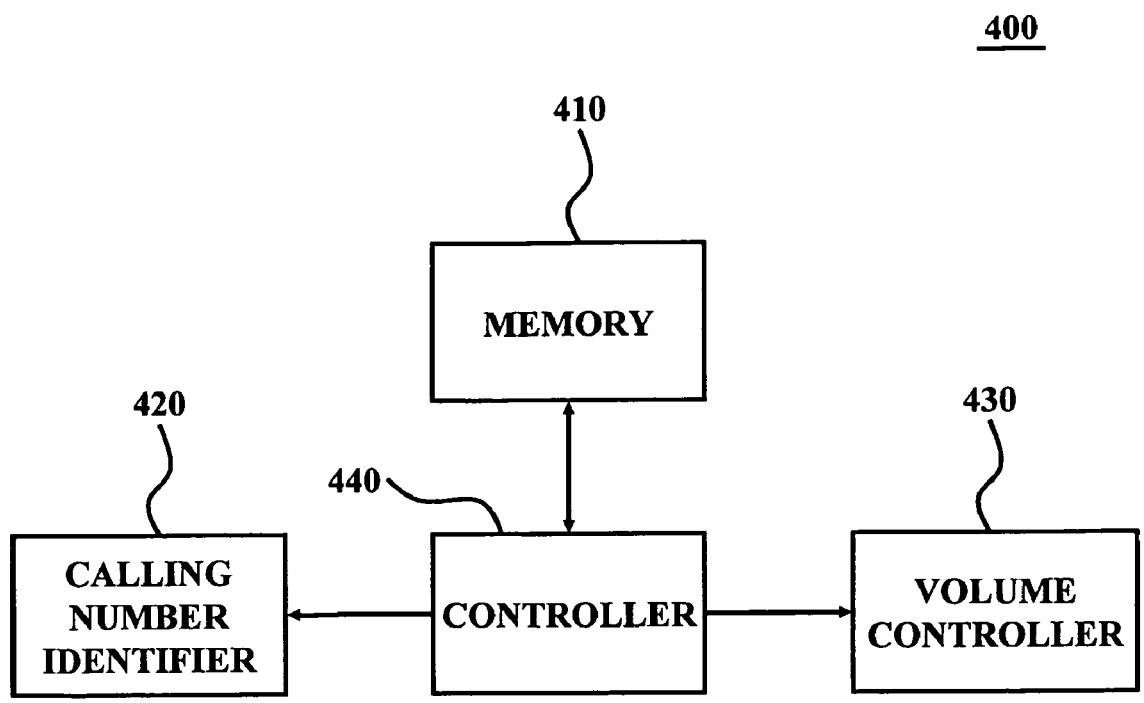

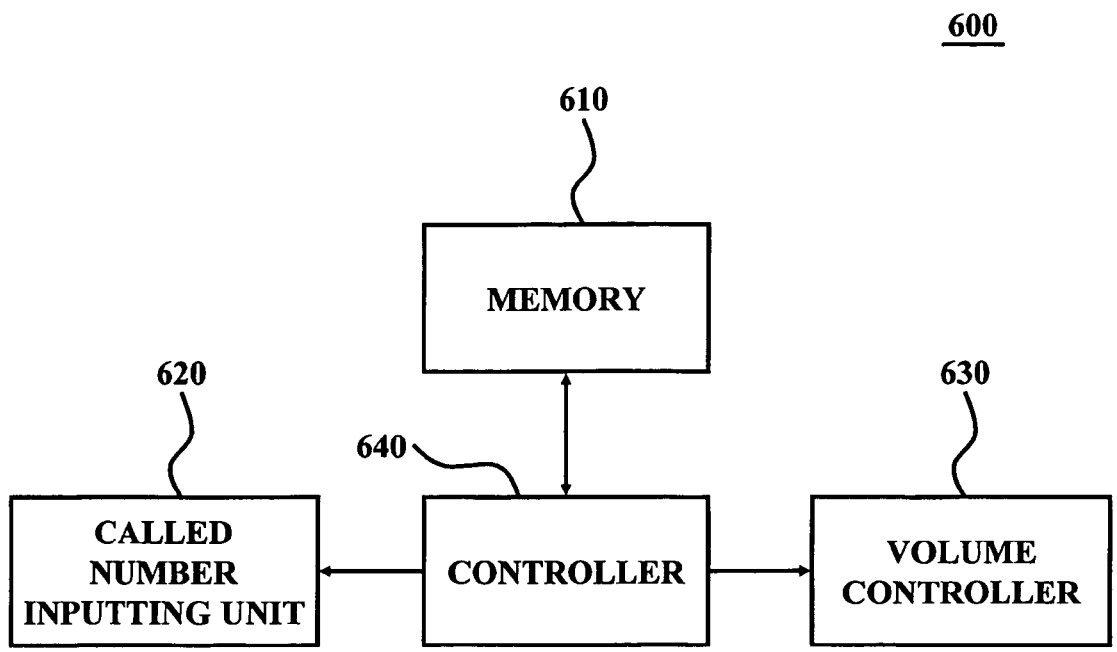

| COMMUNICATION NETWORKS | VOLUME DATA |
|---|---|
| FIRST COMMUNICATION NETWORK | FIRST VOLUME DATA |
| SECOND COMMUNICATION NETWORK | SECOND VOLUME DATA |

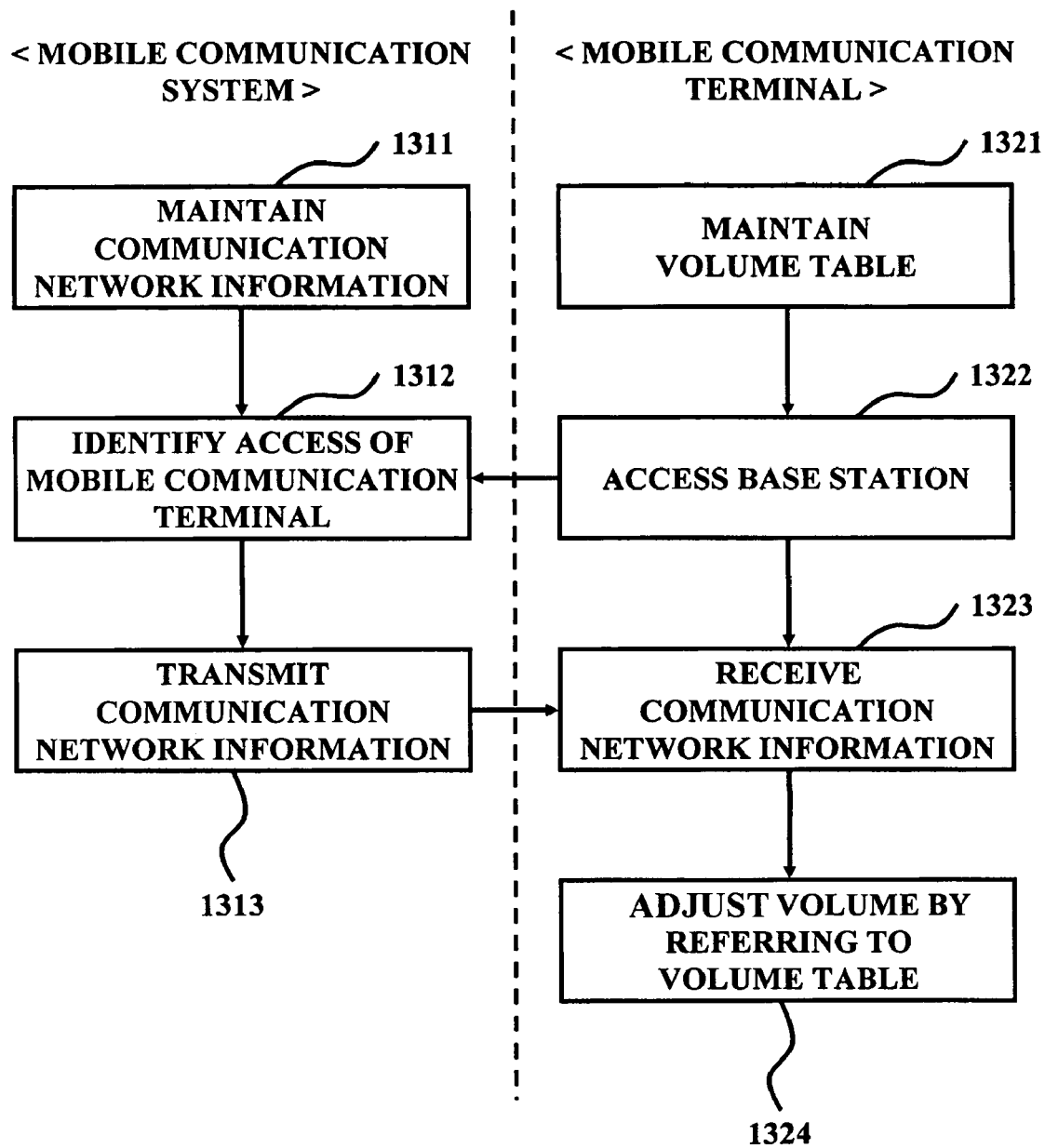

METHOD FOR CONTROLLING VOICE GAIN IN A COMMUNICATION TERMINAL AND APPARATUS OF ENABLING THE METHOD

CROSS-REFERENCE TO RELATED APPLICATIONS

This application claims priority under 35 U.S.C. §119(a) from Republic of Korea Patent Application No. 10-2004-0096090, filed on Nov. 23, 2004, in the Korean Intellectual Property Office, the disclosure of which is incorporated by reference herein in its entity.

BACKGROUND OF THE INVENTION

1. Field of the Invention

The present invention relates to a method for controlling volume of a communication terminal and an apparatus for performing the method. More particularly, the present invention relates to a method for automatically controlling volume so that sending volume and receiving volume are equal in accordance with a communication network accessed at a communication terminal, and an apparatus for performing the method.

2. Description of the Related Art

A mobile communication system in a code division multiple access (CDMA) method has been developed into a second-generation digital technology from a first-generation analog technology. The second-generation mobile communication system has been developed into time division multiple access (TDMA) such as a global system for mobile communication (GSM) and into CDMA. In this instance, TDMA is usually used in European countries, China, a part of the United States, and so on. Also, CDMA is usually used in the United States and Asia-Pacific regions such as Korea, Australia, and the like. Also, as mobile communication services including a concept of personal communication services (PCS) have been commercialized all over the world since the latter half of the 1990's, mobile communication markets have also dramatically grown into a major business. The second-generation mobile communication system has advantages such as stabilized services, inexpensive fares, and the like. Owing to the advantages, mobile telephone services became very popular among general people. However, the second-generation mobile communication system has disadvantages such as services limited to voice calls, service availability limited to a nation or a provider.

To overcome the limits caused by the above technology and frequency band, and to provide multimedia services through faster transmission, International Mobile Telecommunication 2000 (IMT-2000) has appeared as a third-generation mobile communication service. Namely, IMT-2000 enables a user to readily send and receive multimedia information such as voice, image, and data with a party that the user wants, without restriction to time and place, in other words, across the world.

When IMT-2000 is finally fully utilized, multimedia services such as the Internet and image transmission may be provided in a better mobile environment via a super-high speed wired/wireless converged network. Also, IMT-2000 provides global roaming service in which one terminal may be used in any part of the world.

However, domestically, commercialization of IMT-2000 service is being delayed because of mobile communication service providers and other circumstances. CDMA 1x, known as 2.5-generation, mobile communication is being widely used.

An interim standard (IS)-95A/B is a second-generation (hereinafter, "2G") mobile communication system and has a maximum data transmission speed of 64 Kbps. CDMA-2000 1X or (IS)-95C is a 2.5-generation (hereinafter, "1X") mobile communication system and has a maximum data transmission speed of 307 Kbps. The 2G and the 1X mobile communication systems are being used together. Currently, 2G network, that is, IS-95A/B network has been spread nationwide. Also, 1X network, that is, IS-95C network has been laid over the IS-95A/B. Accordingly, when a position of a mobile communication terminal is registered to a mobile communication system using CDMA, the registration is performed by classifying the mobile communication terminal in the 2G network system and the 1X network system. The 2G network system mainly provides voice service, and the 1X network system mainly provides data service. Since most users of mobile communication terminals usually use voice service rather than data service, they subscribe to a provider with a 2G network system.

In the case of testing a conventional mobile communication terminal, the volume when a user accesses the 1X network is larger than the volume when the user accesses the 2G network. Accordingly, Vpp and power also increases and a receiver may be seriously damaged, which may cause a malfunction in a mobile communication terminal.

Also, volume gain set in an accessed communication network such as the 1X network or the 2G network is different and applied differently from volume gain set internally. Accordingly, a user may feel the difference between sending volume and receiving volume.

In the case of a receiver used in a conventional mobile communication terminal is normally about Typical 20 mW and Max 30 mW, when volume gain is set for the 2G network, sound may be too loud and be harsh to the ear in the 1X network. Also, since noise increases as gain increase, a user may find difficulty in communicating.

Namely, in the case of a conventional mobile communication terminal, sending volume and receiving volume is different according to an accessed network. Accordingly, every time a communication network accessed by a user is changed, the user has to adjust the volume.

Accordingly, a communication terminal needs a function of maintaining sending volume and receiving volume to be equal, irrespective of whether an accessed communication network is 1X network or 2G network.

SUMMARY OF THE INVENTION

To solve the aforementioned problems in the conventional art, the present invention provides a method for controlling volume so that sending volume and receiving volume are equal in accordance with a communication network accessed by a mobile communication terminal, and an apparatus for performing the method.

The present invention also provides a method for checking a calling number in a communication terminal and controlling volume so that sending volume and receiving volume are equal in accordance with a communication network of a caller, and an apparatus for performing the method.

The present invention also provides a method for checking a called number in a communication terminal and controlling volume so that sending volume and receiving volume are equal in accordance with a communication network of a called party, and an apparatus for performing the method.

The present invention also provides a method for receiving communication network information from a base station in a mobile communication terminal and controlling volume by referring to a volume table so that sending volume and receiving volume are equal in accordance with a communication network, and an apparatus for performing the method.

To achieve the above objectives, according to an aspect of the present invention, there is provided a method for controlling volume of a mobile terminal accessing a first communication network or a second communication network, the method including the steps of: maintaining a volume table recording first volume data corresponding to the first communication network and second volume data corresponding to the second communication network, the volume data including sending volume data and receiving volume data; accessing a predetermined base station to make a voice call, the base station including the base station belonging to the first communication network or the base station belonging to the second communication network; receiving predetermined communication network information from the accessed base station, the communication network information including information about whether a communication network including the base station is the first communication network or the second communication network; and adjusting volume to the volume data corresponding to the communication network information by referring to the volume table, so that predetermined sending volume and predetermined receiving volume are equal.

Also, according to another aspect of the present invention, there is provided a method for controlling volume of a communication terminal performing a voice call via a plurality of communication networks, the method including the steps of: maintaining a communication network table recording a plurality of communication network information corresponding to a predetermined calling number; maintaining a volume table recording volume data corresponding to the communication network, the volume data including sending volume data and receiving volume data; receiving a predetermined call; receiving a calling number corresponding to the call; identifying a communication network corresponding to the calling number by referring to the communication network table; and adjusting the volume to volume data corresponding to the communication network by referring to the volume table, so that predetermined sending volume and predetermined receiving volume are equal.

Also, according to still another aspect of the present invention, there is provided a method for controlling volume of a communication terminal performing a voice call via a plurality of communication networks, the method including the steps of: maintaining a communication network table recording a plurality of communication network information corresponding to a predetermined called number; maintaining a volume table recording volume data corresponding to the communication network information, the volume data including sending volume data and receiving volume data; receiving an input or selection of a predetermined called number from a user at the attempt of receiving a call; identifying communication network information corresponding to the called number by referring to the communication network table; and adjusting the volume to volume data corresponding to the communication network information by referring to the volume table, so that predetermined sending volume and predetermined receiving volume are equal.

Also, according to yet another aspect of the present invention, there is provided a method for controlling volume in a mobile communication system providing voice call services via a plurality of communication networks, the method including the steps of: maintaining communication network information corresponding to the plurality of communication networks, the communication network information including a type of the communication network or volume data corresponding to the communication network; identifying an access of a predetermined mobile communication terminal via a predetermined base station; and transmitting the communication network information from the base station to the mobile terminal, and the mobile communication terminal performing the steps of: maintaining a volume table recording volume data corresponding to the plurality of communication network information, the volume data including sending volume data and receiving volume data; receiving the communication network information from the accessed base station; and adjusting the volume to volume data by referring to the volume table, so that predetermined sending volume and predetermined receiving volume are equal in accordance with the communication network.

Also, according to a further aspect of the present invention, there is provided an apparatus for controlling volume at a mobile terminal performing a voice call via a plurality of communication networks, the apparatus including: a memory storing a volume table recording volume data corresponding to the plurality of communication networks, the volume data including sending volume data and receiving volume data; a receiving unit accessing a predetermined base station and receiving predetermined communication network information from the accessed base station; a volume controller controlling predetermined volume; and a controller controlling the volume controller to adjust the volume in accordance with volume data corresponding to the communication network information by referring to the volume table, so that predetermined sending volume and predetermined receiving volume are equal.

Also, according to another aspect of the present invention, there is provided a communication terminal performing a voice call via a plurality of communication networks, the terminal including: a memory storing a communication network table recording communication network information corresponding to a predetermined calling number and a volume table recording volume data corresponding to the plurality of communication networks, the volume data including receiving volume data and sending volume data; a calling number identifier identifying a calling number of a calling party in accordance with receipt of a predetermined call; a volume controller controlling predetermined volume; and a controller identifying a communication network corresponding to the calling number by referring to the communication network table and controlling the volume controller to adjust the volume to volume data corresponding to the communication network by referring to the volume table, so that predetermined receiving volume and predetermined sending volume are equal.

Also, according to another aspect of the present invention, there is provided a communication terminal performing a voice call via a plurality of communication networks, the terminal including: a memory storing a communication network table recording a plurality of communication network information corresponding to a predetermined called number and a volume table recording volume data about the communication network, the volume data including receiving volume data and sending volume data; a called number inputting unit receiving a predetermined called number from a user in accordance with transmission of a predetermined call; a volume controller adjusting volume in accordance with volume data corresponding to the communication network by referring to the volume table, so that predetermined receiving volume and predetermined sending volume are equal; and a controller identifying a communication network corresponding to the called number by referring to the communication network table and controlling the volume controller to adjust the volume in accordance with the communication network.

Also, according to another aspect of the present invention, there is provided an apparatus for controlling volume of a mobile communication terminal performing a voice call via a first communication network or a second communication network, the apparatus including: a memory storing first volume data corresponding to the first communication network and second volume data corresponding to the second communication network, the volume data including sending volume data and receiving volume data; a communication network identifier accessing the first communication network or the second communication network to make a voice call and identifying information on the accessed communication network; and a volume converter adjusting predetermined volume to the first volume data or the second volume data in accordance with the communication network information by referring to the memory, so that predetermined receiving volume and predetermined sending volume are equal.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram illustrating a configuration of a volume controlling apparatus in a communication terminal according to another embodiment of the present invention;

FIG. 5 is a diagram illustrating a communication network table corresponding to a calling number according to another embodiment of the present invention;

FIG. 6 is a diagram illustrating a configuration of a volume controlling apparatus in a communication terminal according to still another embodiment of the present invention;

FIG. 7 is a diagram illustrating a communication network table corresponding to a called number according to still another embodiment of the present invention;

FIG. 13 is a flowchart illustrating a method of controlling volume in a mobile communication system according to yet another embodiment of the present invention.

DETAILED DESCRIPTION OF THE INVENTION

A communication terminal widely used in the present specification is a concept of terminals having a predetermined computation ability by including a predetermined communication module and a predetermined processor, such as mobile communication terminals, wired/wireless telephones, smart phones, cellular phones, and the like. In this instance, the communication module includes a code division multiple access (CDMA) module, a Bluetooth module, an Infrared Data Association (IrDA) module, and a wired/wireless communication module.

Hereinafter, a method of controlling volume in a communication terminal according to the present invention and an apparatus for performing the method will be described in detail with reference to the accompanying drawings.

Figure 1:
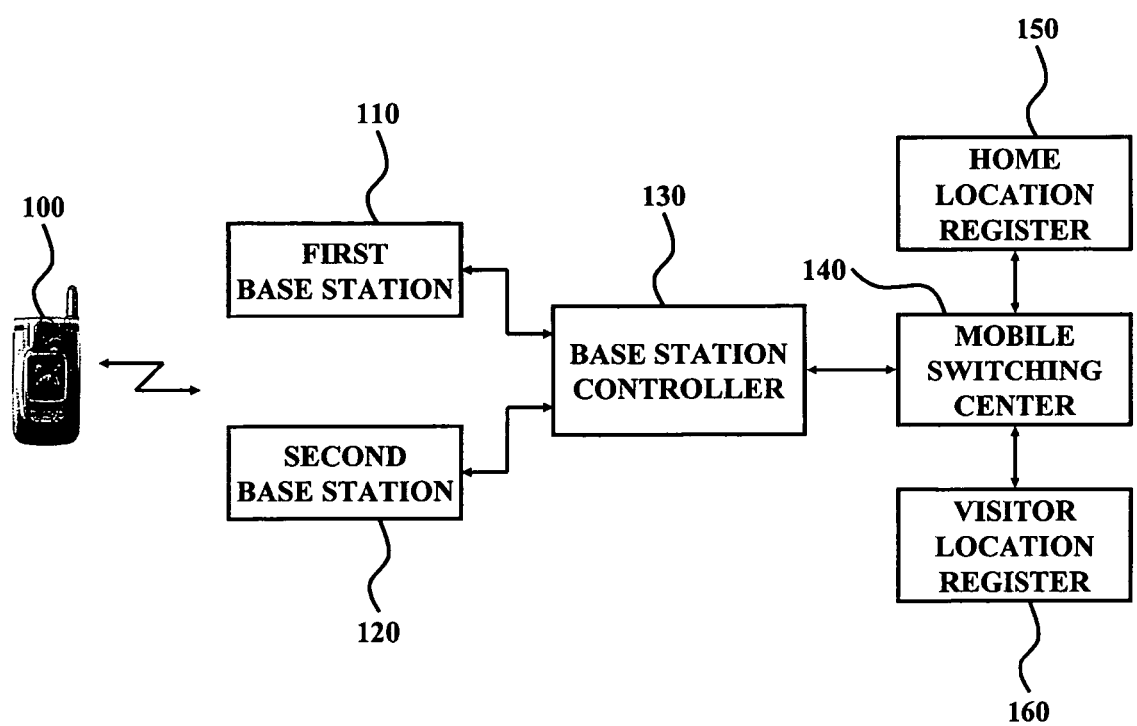
FIG. 1 is a diagram illustrating a schematic configuration of a mobile communication system according to the present invention.

FIG. 1 is a diagram illustrating a schematic configuration of a mobile communication system according to the present invention. The mobile communication system includes a mobile communication terminal 100, a first base station 110, a second base station 120, a base station controller 130, a mobile switching center 140, a home location register 150, and a visitor location register 160.

Figures 2, 3:
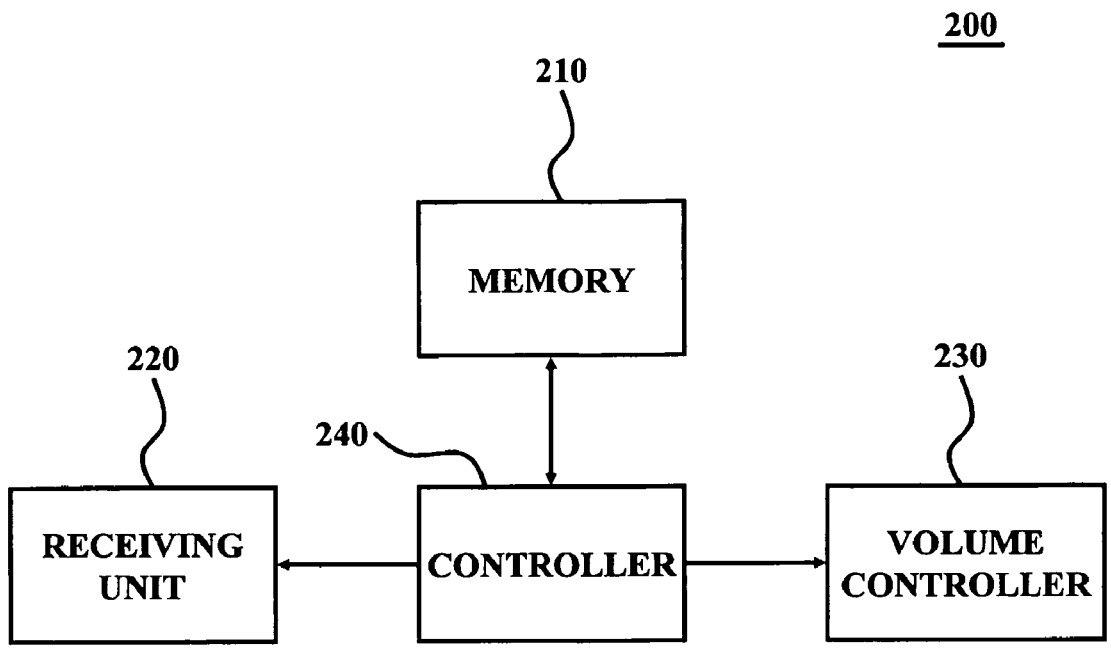
FIG. 2 is a diagram illustrating a configuration of a volume controlling apparatus in a mobile communication terminal according to an embodiment of the present invention.
FIG. 3 is a diagram illustrating a volume table corresponding to a communication network according to an embodiment of the present invention.

Referring to FIG. 1, the mobile communication terminal 100 accesses the first base station 110 or the second base station 120 to perform a predetermined communication, and receives predetermined communication network information from the first base station 110 or the second base station 120. The mobile communication terminal 100 stores a volume table recording volume data corresponding to communication network information in a predetermined memory unit, and adjusts volume to volume data corresponding to the received communication network information by referring to the volume table. In this instance, the volume table is illustrated in FIG. 3. The volume data includes sending volume data and receiving volume data. The mobile communication terminal 100 controls the volume so that sending volume and receiving volume are equal in accordance with the received communication network.

The first base station 110 belongs to a first communication network and maintains communication network information corresponding to the first communication network. Also, as an access of the mobile communication terminal 100 is detected, the first base station 110 transmits the communication network information to the mobile communication terminal 100. The second base station 120 belongs to a second communication network and maintains communication network information corresponding to the second communication network. Also, as an access of the mobile communication terminal 100 is detected, the second base station 120 transmits the communication network information to the mobile communication terminal 100.

The base station controller 130 controls the first base station 110 and the second base station 120, performs all necessary functions for wireless call processing such as hand-off or the like, and transmits subscriber information of the mobile communication terminal 100 of which location is registered, to the mobile switching center 140. The mobile switching center 140 has a function to control the base station controller 130 to effectively operate the first base station 110 and the second base station 120. Also, the mobile switching center 140 has a function to interact with a switch point of a public telephone network. The home location register 150 is a database storing service profiles about subscriber information on a user of the mobile communication terminal 100. The home location register 150 has information on a subscriber's telephone call, mobile identification number (MIN) and electronic serial number (ESN) of the mobile communication terminal 100, and the type of service. When subscriber information is received from the base station controller 130, the mobile switching center 140 temporarily stores subscriber information of the mobile communication terminal 100 in the visitor location register 160. After this, the mobile switching center 140 requests the home location register 150 to register the location of the mobile communication terminal 100.

FIG. 2 is a diagram illustrating a configuration of a volume controlling apparatus in a mobile communication terminal according to an embodiment of the present invention. In FIG. 2, a volume controlling apparatus 200 of the mobile communication terminal includes a memory 210, a receiving unit 220, a volume controller 230, and a controller 240.

Referring to FIGS. 1 and 2, the memory 210 stores a volume table recording volume data corresponding to a plurality of communication networks. The volume table is illustrated in FIG. 3. The volume data includes sending volume data and receiving volume data. After the mobile communication terminal 100 accesses the first base station 110 or the second base station 120, the receiving unit 220 receives predetermined communication network information from the first base station 110 or the second base station 120. The volume controller 230 controls predetermined volume. The controller 240 controls the volume controller 230 to adjust the volume in accordance with volume data corresponding to the communication network information by referring to the volume table, so that predetermined sending volume and predetermined receiving volume are equal.

FIG. 3 is a diagram illustrating a volume table corresponding to a communication network according to an embodiment of the present invention.

Referring to FIGS. 2 and 3, the volume table makes sending volume data and receiving volume data respectively correspond to a plurality (N) of communication network information. The sending volume and the receiving volume may be different for each of the plurality of communication networks. The sending volume data and the receiving volume data are needed to adjust volume so that sending volume and receiving volume are equal by considering the above fact.

Referring to FIG. 3, in the case the communication network is a first communication network, sending volume data is "10" and receiving volume data is "15". Thus, it may be determined that the first communication network itself has a condition where sending volume is larger than receiving volume. The controller 240 controls the volume controller 230 so that a receiving volume level is higher than a sending volume level to make the sending volume and the receiving volume equal.

In the case the communication network is a second communication network, sending volume data is "15" and receiving volume data is "10." Thus, it may be determined that the second communication network itself has a condition where receiving volume is larger than sending volume. The controller 240 controls the volume controller 230 so that a sending volume level is higher than a receiving volume level to make the sending volume and the receiving volume equal.

In the case the communication network is an N communication network, the sending volume and the receiving volume data is the same, "15." Thus, it may be determined that the N communication network has a condition where the sending volume and the receiving volume are equal. In the case of the N communication network, since the sending volume data and the receiving volume data are equal, the controller 240 does not need to control volume via the volume controller 230.

FIG. 4 is a diagram illustrating a configuration of a volume controlling apparatus according to another embodiment of the present invention. In FIG. 4, a volume controlling apparatus 400 includes a memory 410, a calling number identifier 420, a volume controller 430, and a controller 440.

Referring to FIG. 4, the memory 410 stores a communication network table recording communication network information corresponding to a calling number. The communication network table is illustrated in FIG. 5. Also, the memory 410 stores a volume table recording volume data corresponding to a plurality of communication networks as illustrated in FIG. 3. The volume data includes sending volume data and receiving volume data. At the receipt of a predetermined call, the calling number identifier 420 receives information on the received call and identifies a calling number from information on the received call. In this instance, the information is transmitted from an accessed communication network. The volume controller 430 controls predetermined volume. The controller 440 identifies a communication network corresponding to the calling number by referring to the communication network table. Also, the controller 440 controls the volume controller 430 to adjust predetermined volume in accordance with volume data corresponding to the communication network information by referring to the volume table, so that predetermined sending volume and predetermined receiving volume are equal.

FIG. 5 is a diagram illustrating a communication network table corresponding to a calling number according to another embodiment of the present invention.

Referring to FIGS. 4 and 5, the communication network table records communication network information corresponding to a calling number. The communication network table shows that a communication network corresponding to the calling number is a first communication network when the calling number is "011-111-1111", and that a communication network corresponding to the calling number is a second communication network when the calling number is "016-222-2222." The calling number identifier 420 receives information on the received call and identifies the calling number such as "011-111-1111" or "016-222-2222." Namely, in the case the calling number is "011-111-1111", the controller 440 identifies a communication network corresponding to the calling number as the first communication network by referring to the communication network table. Also, in the case the calling number is "016-222-2222", the controller 440 identifies a communication network corresponding to the calling number as the second communication network by referring to the communication network table. The controller 440 controls the volume controller 430 by referring to the volume table, so that sending volume and receiving volume are equal in correspondence with a communication network identified on the basis of the calling number.

FIG. 6 is a diagram illustrating a configuration of a volume controlling apparatus according to still another embodiment of the present invention. In FIG. 6, a volume controlling apparatus 600 controls a memory 610, a called number inputting unit 620, a volume controller 630, and a controller 640.

Referring to FIG. 6, the memory 610 stores a communication network table recording communication network information corresponding to a called number. The communication network table is illustrated in FIG. 7. The memory 610 stores a volume table recording volume data corresponding to a plurality of communication networks, as illustrated in FIG. 3. The volume data includes sending volume data and receiving volume data. The called number inputting unit 620 receives a called number from a user when the user attempts to make a call. In this instance, the called number is a telephone number of a called party. The volume controller 630 controls predetermined volume. The controller 640 identifies a communication network corresponding to the called number by referring to the communication network table. Also, the controller 640 controls the volume controller 620 to adjust predetermined volume in accordance with volume data corresponding to the communication network information by referring to the volume table, so that predetermined sending volume and predetermined receiving volume are equal.

FIG. 7 is a diagram illustrating a communication network table corresponding to a called number according to still another embodiment of the present invention.

Referring to FIGS. 6 and 7, the communication network table records communication network information corresponding to a called number. The communication network table shows that a communication network corresponding to the called number is a first communication network when the called number is "011-111-1111", and that a communication network corresponding to the called number is a second communication network when the called number is "016-222-2222". The called number inputting unit 620 receives the called number such as "011-111-1111" or "016-222-2222" from a user. In this instance, the called number is a telephone number of a called party to whom the user wants to make a call. Namely, in the case the called number is "011-111-1111", the controller 640 identifies a communication network corresponding to the called number as the first communication network by referring to the communication network table. In the case the called number is "016-222-2222", the controller 640 identifies a communication network corresponding to the called number as the second communication network by referring to the communication network table. The controller 640 controls the volume controller 630 in accordance with a communication network identified in correspondence to the called number by referring to the volume table, so that sending volume and receiving volume are equal.

Figures 8, 9:
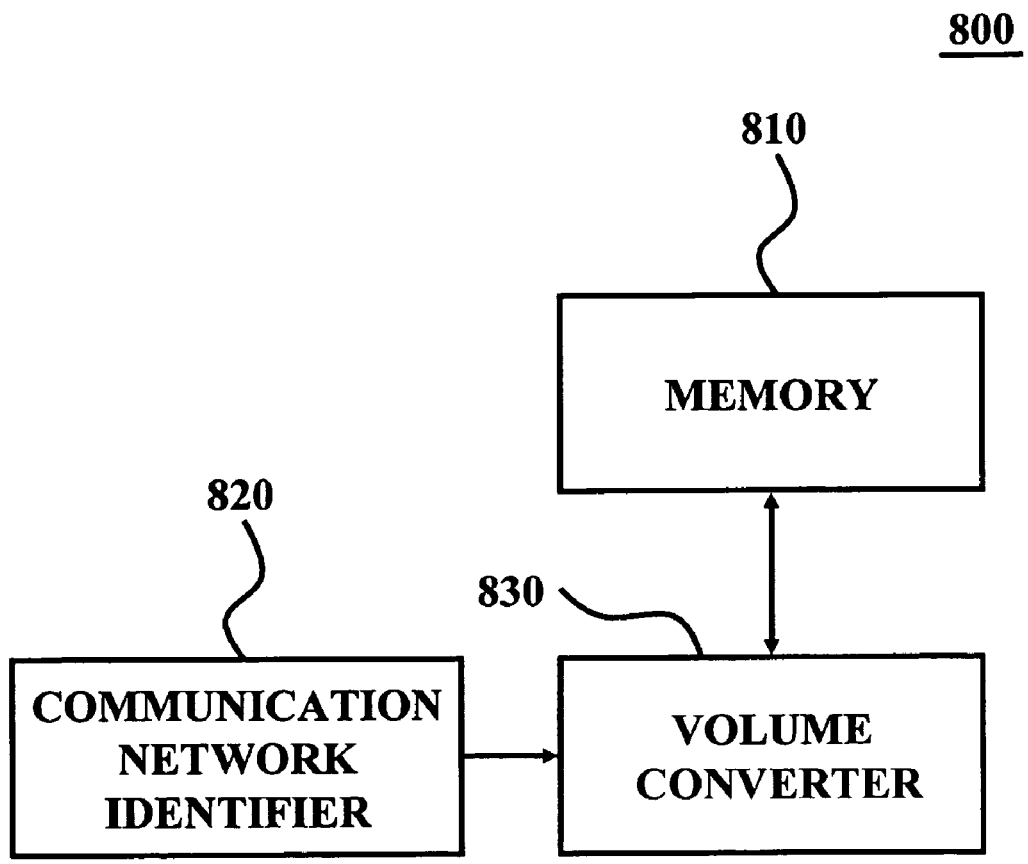
FIG. 8 is a diagram illustrating a configuration of a volume controlling apparatus in a communication terminal according to yet another embodiment of the present invention.
FIG. 9 is a diagram illustrating a volume table according to yet another embodiment of the present invention.

FIG. 8 is a diagram illustrating a configuration of a volume controlling apparatus according to yet another embodiment of the present invention. In FIG. 8, a volume controlling apparatus 800 includes a memory 810, a communication network identifier 820, and a volume converter 830.

Referring to FIG. 8, the memory 810 stores a volume table recording volume data corresponding to a communication network. The volume table is illustrated in FIG. 9. The volume data includes sending volume data and receiving volume data. At the receipt of a predetermined call, the communication network identifier 820 receives information on the received call transmitted from an accessed communication network, and identifies a calling number from the received call. The volume converter 830 identifies a communication network corresponding to the calling number by referring to the volume table. Also, the volume converter 830 converts predetermined volume in accordance with volume data corresponding to the communication network information by referring to the volume table, so that predetermined sending volume and predetermined receiving volume are equal.

FIG. 9 is a diagram illustrating a volume table according to yet another embodiment of the present invention. In FIG. 9, the volume table includes first volume data corresponding to a first communication network and second volume data corresponding to a second communication network.

Referring to FIGS. 8 and 9, the volume converter 830 converts the volume to the first volume data when the communication network information is the first communication network information. Also, the volume converter 830 converts the volume data to the second volume data when the communication network information is the second communication network. The first communication network may be an 1X network, and the second communication network may be a 2G network.

Figure 10:
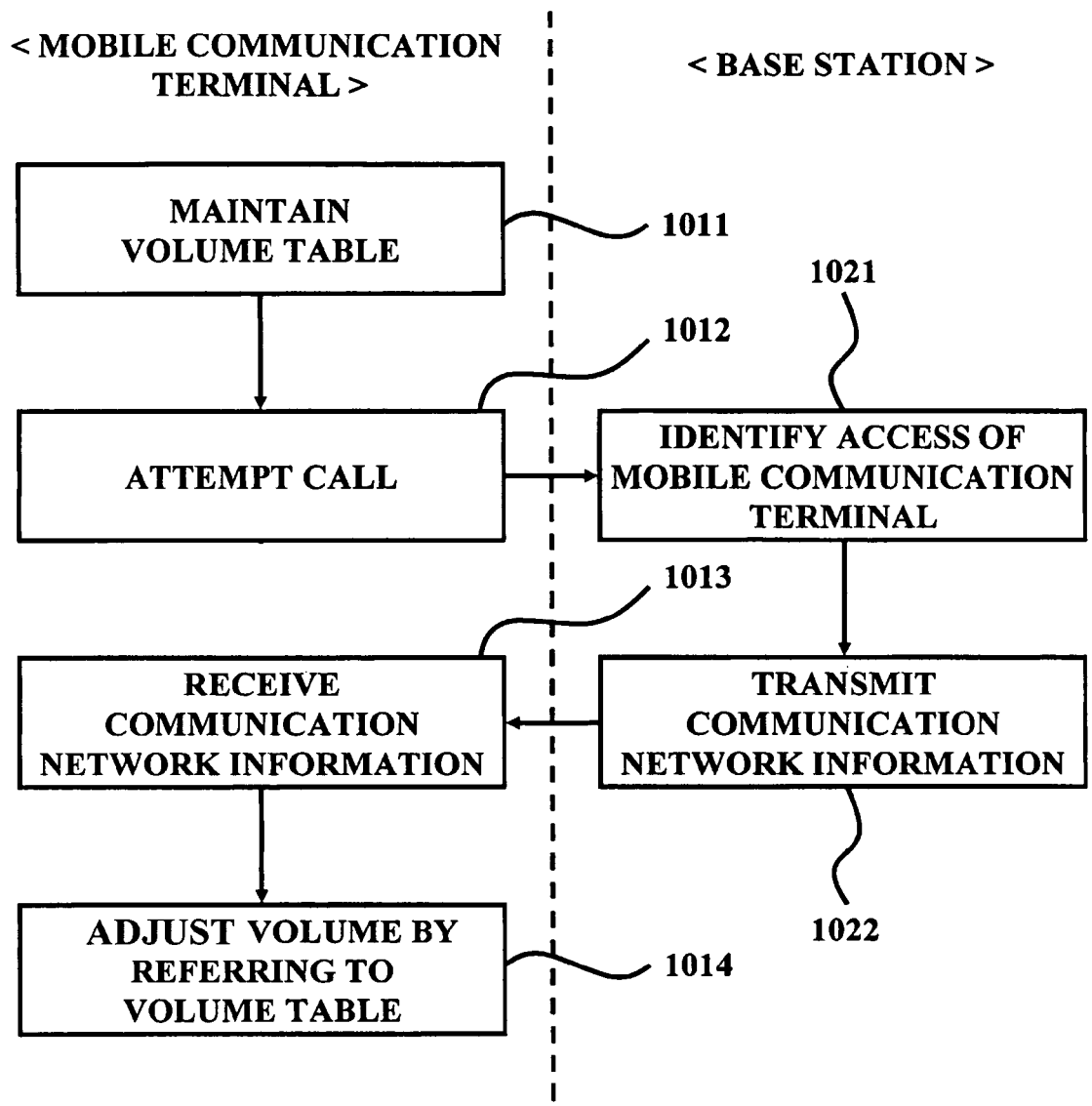
FIG. 10 is a flowchart illustrating a method of controlling volume in a mobile communication terminal according to an embodiment of the present invention.

FIG. 10 is a flowchart illustrating a method of controlling volume in a mobile communication terminal according to an embodiment of the present invention. FIG. 10 shows a method of receiving communication network information from a base station in a mobile communication terminal performing a voice call via a first communication network or a second communication network, and adjusting volume in accordance with the received communication network, so that sending volume and receiving volume are equal.

Referring to FIGS. 1 and 10, in step 1011, the mobile communication terminal 100 maintains a volume table recording first volume data corresponding to a first communication network and second volume data corresponding to a second communication network. The volume table is illustrated in FIG. 9. The volume data includes sending volume data and receiving volume data. In step 1012, in the case a user attempts to make a call to a predetermined number, the mobile communication network terminal 100 attempts to access the first base station 110 or the second base station 120 in accordance with the attempt of the call.

In step 1021, the first base station 110 or the second base station 120 identifies an access of the mobile communication terminal 100. In step 1022, the first base station 110 or the second base station 120 transmits communication network information on its associated communication network to the accessed mobile communication network 100. The communication network information includes information about whether the communication network including the base station is the first communication network or the second communication network. The base station includes the base station associated with the first communication network or the base station associated with the second base station. In the case a base station is associated with the first communication network, the first base station 110 transmits communication network information on the first communication network to the mobile communication terminal 100. Also, in the case a base station is associated with the second communication network, the second base station 120 transmits communication network information on the second communication network to the mobile communication terminal 100.

In step 1013, the mobile communication terminal 100 receives the communication network information from the first base station 110 or the second base station 120. In step 1014, the mobile communication terminal 100 adjusts predetermined volume in accordance with the communication network by referring to the volume table, so that predetermined sending volume and predetermined receiving volume are equal.

A user making a voice call via a first communication network will be described next. In this instance, in the case receiving volume data is larger than sending volume data in the first communication network, the mobile communication terminal 100 increases the sending volume to the receiving volume or decreases the receiving volume to the sending volume.

A user making a voice call via a second communication network will be described next. In this instance, in the case receiving volume data is smaller than sending volume data in the second communication network, the mobile communication terminal 100 decreases the sending volume to the receiving volume, or increases the receiving volume to the sending volume.

Namely, the mobile communication terminal 100, in advance, recognizes the difference between sending volume and receiving volume in accordance with the first communication network or the second communication network. In the case of having a volume table recording the sending volume data and the receiving volume data, the mobile communication terminal 100 may adjust volume to volume data corresponding to the communication network in accordance with the communication network information. In this instance, the sending volume and the receiving volume is adjusted to be equal in the volume table.

Figure 11:
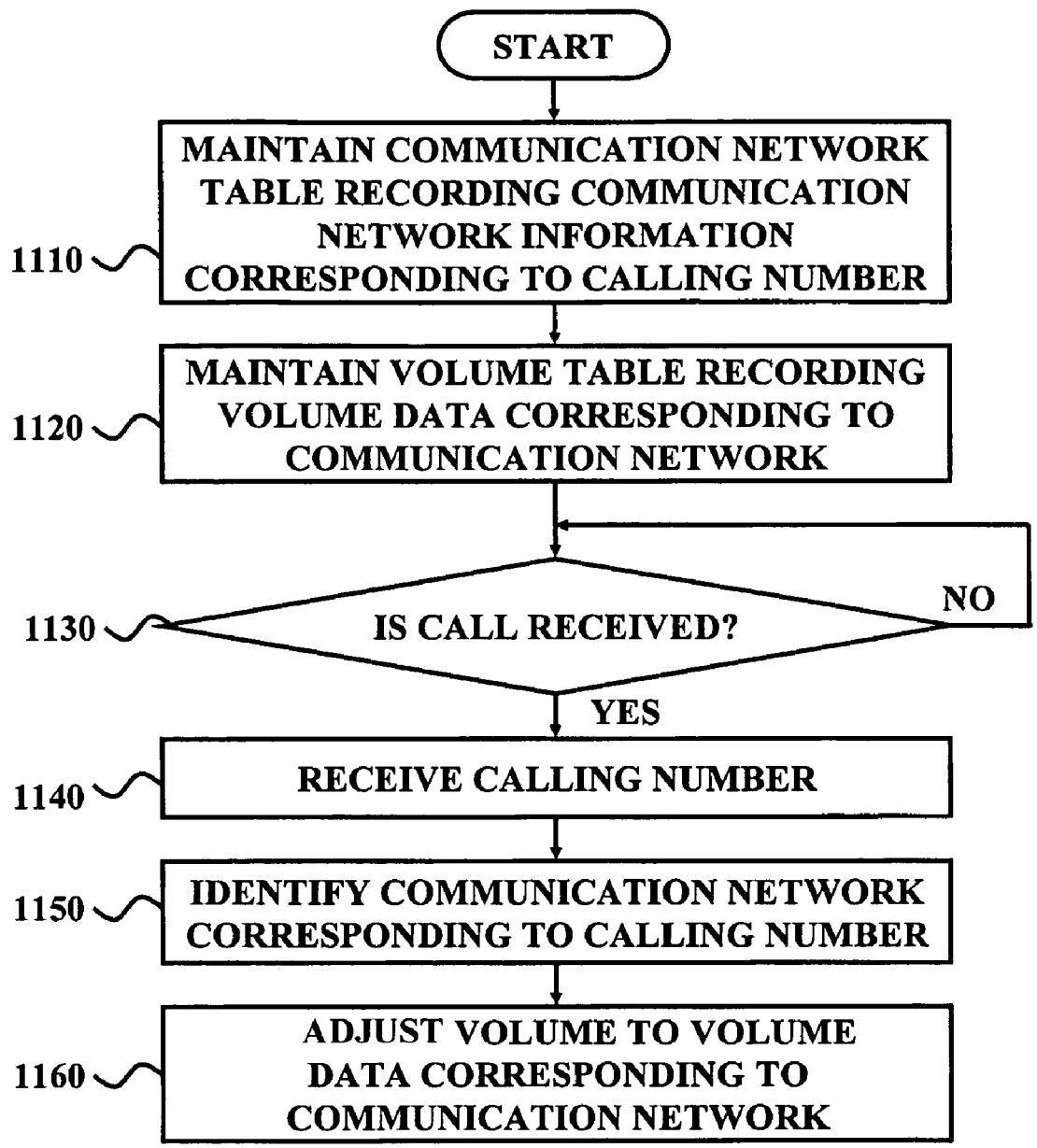
FIG. 11 is a flowchart illustrating a method of controlling volume in a communication terminal according to another embodiment of the present invention.

FIG. 11 is a flowchart illustrating a method of controlling volume in a communication terminal in accordance with another embodiment of the present invention. FIG. 11 shows a method of controlling volume in accordance with a communication network corresponding to a calling number, in a communication terminal performing a voice call via any one of a plurality of communication networks.

Referring to FIG. 11, the communication terminal may perform a voice call via at least one of a plurality of communication terminals. In step 1110, the communication terminal maintains a table recording a plurality of communication network information corresponding to a predetermined calling number. The table is illustrated in FIG. 5. In step 1120, the communication terminal maintains a volume table recording volume data corresponding to the communication network. The volume table is illustrated in FIG. 3. The volume data includes predetermined sending volume data and predetermined receiving volume data. In step 1130, the communication terminal determines whether a predetermined call is received. In the case of receiving the call, the communication terminal receives subscriber information corresponding to the received call and identifies a calling number from the subscriber information in step 1140. In step 1150, the communication terminal identifies a communication network corresponding to the calling number by referring to the communication network table. In step 1160, the communication terminal adjusts predetermined volume by referring to the volume table, so that predetermined sending volume and predetermined receiving volume are equal in accordance with the communication terminal.

Figure 12:
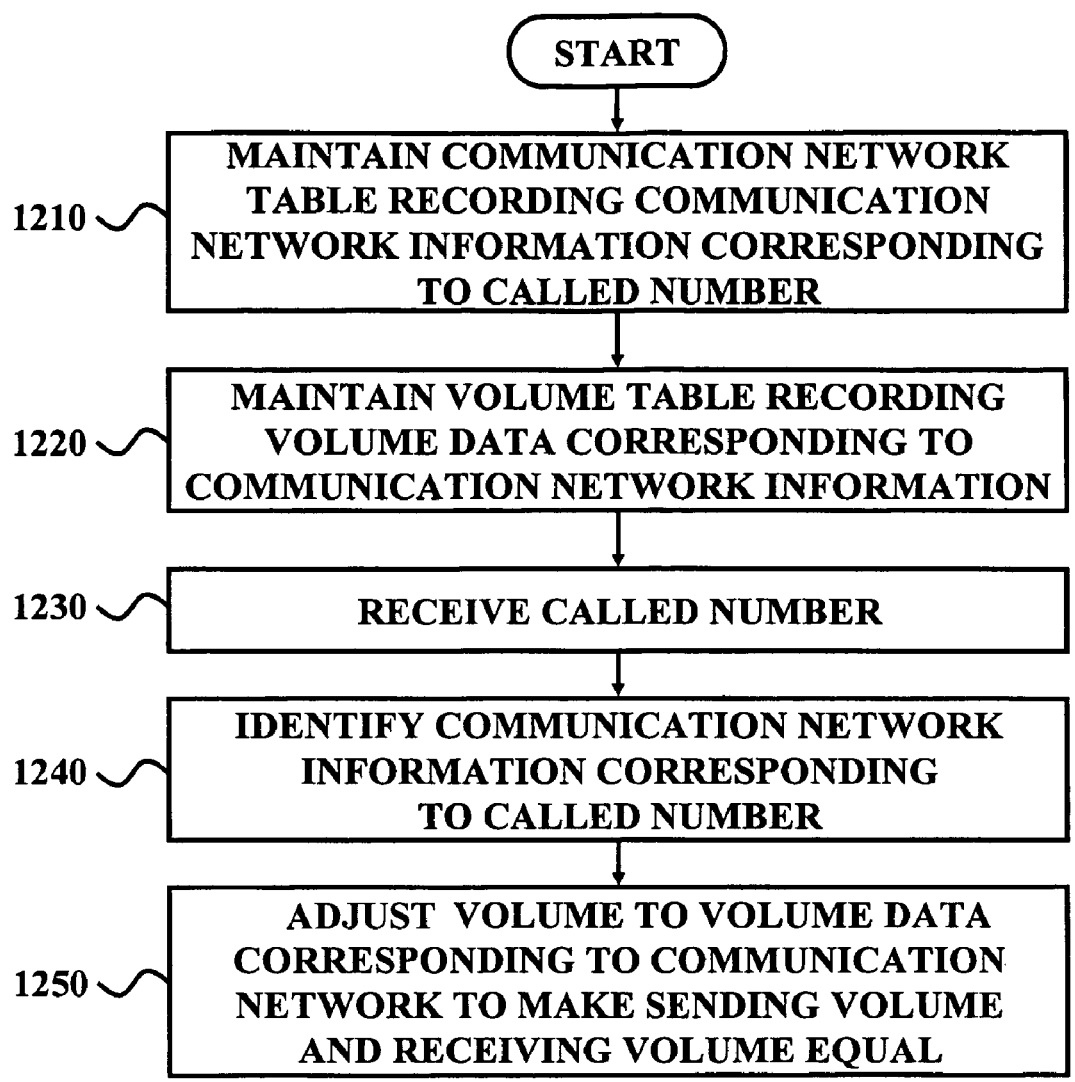
FIG. 12 is a flowchart illustrating a method of controlling volume in a communication terminal according to still another embodiment of the present invention.

FIG. 12 is a flowchart illustrating a method of controlling volume in a communication terminal according to still another embodiment of the present invention. FIG. 12 shows a method of controlling volume in accordance with a communication network corresponding to a called number, in a communication terminal performing a voice call via any one of a plurality of communication networks.

Referring to FIG. 12, in step 1210, the communication terminal maintains a table recording a plurality of communication terminal information corresponding to a predetermined called number, as illustrated in FIG. 7. In step 1220, the communication terminal maintains a volume table recording volume data corresponding to the communication network, as illustrated in FIG. 3. The volume data includes predetermined sending volume data and predetermined receiving volume data. In step 1230, the communication terminal receives a called number from a user. In this instance, the called number is a telephone number of a called party that the user wants to make a call to. In the case of establishing a call, the communication terminal identifies a communication network corresponding to the called number by referring to the communication network table in step 1240. In step 1250, the communication terminal adjusts predetermined volume by referring to the volume table, so that predetermined sending volume and predetermined receiving volume are equal in accordance with the communication network.

FIG. 13 is a flowchart illustrating a method of controlling volume in a mobile communication system according to yet another embodiment of the present invention. FIG. 13 shows a method how a mobile communication terminal controls volume in accordance with communication network information when the communication network information is transmitted to the accessing mobile communication terminal from a mobile communication system providing voice call service via a plurality of communication networks.

Referring to FIG. 13, in step 1311, the mobile communication system maintains communication network information corresponding to the plurality of communication networks. The communication network information includes the type of communication network or volume data corresponding to the communication network. In step 1312, the mobile communication system identifies an access of a predetermined mobile communication terminal via a predetermined base station. In step 1313, the mobile communication system transmits the communication network information to the mobile communication terminal via the base station.

In step 1321, the mobile communication terminal maintains a volume table recording volume data corresponding to the plurality of communication network information. The volume data includes sending volume data and receiving volume data. In step 1322, the mobile communication terminal accesses a base station. In step 1323, the mobile communication terminal receives the communication network information from the base station in accordance with receipt or transmission of a predetermined call. In step 1324, the mobile communication terminal adjusts predetermined volume to volume data corresponding to the communication network information by referring to the volume table, so that predetermined sending volume and predetermined receiving volume are equal.

The embodiments according to the present invention may have computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

According to the present invention, communication network information is received from an accessed base station in a mobile communication terminal and volume is automatically adjusted to make sending volume and sending volume equal in accordance with the received communication network information. Accordingly, a user does not need to do anything to control volume.

Also, according to the present invention, volume may be automatically adjusted to make sending volume and receiving volume equal in accordance with a calling communication network by checking a calling number in a communication terminal.

Also, according to the present invention, volume may be automatically adjusted to make sending volume and receiving volume equal in accordance with a called communication network by checking a called number in a communication terminal.

Also, according to the present invention, volume may be automatically adjusted to make sending volume and receiving volume equal by receiving communication network information from an accessed base station in a mobile communication system and referring to a volume table.

Also, according to the present invention, communication information is transmitted to a mobile communication network accessed in a mobile communication system and volume may be automatically adjusted in accordance with the received communication network information.

Also, according to the present invention, in the case a user makes a call via a communication terminal using different communication networks, sending volume and receiving volume is automatically adjusted to be appropriated for each communication network. Accordingly, the user may make a call optimal in volume without separately controlling volume.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for controlling volume of a mobile terminal accessing a first communication network or a second communication network, the method comprising the steps of:

maintaining a volume table recording first volume data corresponding to the first communication network and second volume data corresponding to the second communication network, the volume data including sending volume data and receiving volume data;

accessing a base station to make a voice call, the base station being a first base station belonging to the first communication network or a second base station belonging to the second communication network;

receiving communication network information from the accessed base station, the communication network information including information about whether the accessed base station belongs to the first communication network or the second communication network; and adjusting audio volume of the mobile terminal to the volume data corresponding to the communication network information by referring to the volume table, so that sending audio volume and receiving audio volume are equal.

2. A computer comprising a central processing unit and a memory, the central processing unit to perform the method of claim 1 by executing a code stored on a computer readable recording medium.

3. A method for controlling volume of a communication terminal performing a voice call via a first communication network or a second communication network, the method comprising the steps of:

maintaining a communication network table recording communication network information corresponding to a calling number;

maintaining a volume table recording volume data corresponding to the first communication network and the second communication network, the volume data including sending volume data and receiving volume data;

receiving a call;

receiving the calling number, the calling number corresponding to the call;

identifying a communication network corresponding to the calling number as the first communication network or the second communication network by referring to the communication network table; and adjusting audio volume of the communication terminal to the volume data corresponding to the communication network corresponding to the calling number by referring to the volume table, so that sending audio volume and receiving audio volume are equal.

4. A method for controlling volume of a communication terminal performing a voice call via a plurality of communication networks, the method comprising the steps of:

maintaining a communication network table recording communication network information corresponding to a called number;

maintaining a volume table recording volume data corresponding to the communication network information, the volume data including sending volume data and receiving volume data;

receiving an input or selection of the called number from a user;

identifying communication network information corresponding to the called number by referring to the communication network table; and adjusting audio volume of the communication terminal to the volume data corresponding to the communication network information corresponding to the called number by referring to the volume table, so that sending audio volume and receiving audio volume are equal.

5. A method for controlling volume in a mobile communication system providing voice call services via a plurality of communication networks, the method comprising the steps of:

maintaining communication network information including an identification of the communication network or volume data corresponding to the communication network;

identifying an access of a mobile communication terminal via a base station ; and transmitting the communication network information from the base station to the mobile communication terminal, and the mobile communication terminal performing the steps of:

maintaining a volume table recording volume data corresponding to the communication network information, the volume data including sending volume data and receiving volume data;

receiving the communication network information from the base station; and adjusting audio volume of the mobile communication terminal to volume data by referring to the volume table, so that sending audio volume and receiving audio volume are equal in accordance with the communication network.

6. An apparatus for controlling volume at a mobile terminal performing a voice call via a first communication network or a second communication network, the apparatus comprising:

a memory to store a volume table to record volume data corresponding to the first communication network and the second communication network , the volume data including sending volume data and receiving volume data;

a receiving unit to access a base station and to receive communication network information from the accessed base station, the communication network information identifying whether the accessed base station belongs to the first communication network or the second communication network;

a volume controller to control volume; and a controller to control the volume controller to adjust the audio volume of the mobile terminal in accordance with volume data corresponding to the communication network information by referring to the volume table, so that sending audio volume and receiving audio volume are equal.

7. A communication terminal performing a voice call via a first communication network or a second communication network, the communication terminal comprising:

a memory to store a communication network table to record communication network information corresponding to a calling number, and to store a volume table to record volume data corresponding to the first communication network and the second communication network, the volume data including receiving volume data and sending volume data;

a calling number identifier to identify a calling number of a calling party in accordance with receipt of a call;

a volume controller to control volume; and a controller to identify a communication network corresponding to the calling number as the first communication network or the second communication network by referring to the communication network table and to control the volume controller to adjust the audio volume of the communication terminal to volume data corresponding to the communication network corresponding to the calling number by referring to the volume table, so that receiving audio volume and sending audio volume are equal.

8. A communication terminal performing a voice call via a first communication network or a second communication network, the communication terminal comprising:

a memory to store a communication network table to record communication network information corresponding to a called number, and to store a volume table to record volume data about the first communication network and the second communication network, the volume data including receiving volume data and sending volume data;

a called number inputting unit to receive a called number from a user in accordance with transmission of a call;

a volume controller to adjust volume in accordance with volume data corresponding to the first communication network or the second communication network by referring to the volume table, so that receiving audio volume and sending audio volume are equal; and a controller to identify a communication network corresponding to the called number as the first communication network or the second communication network by referring to the communication network table, and to control the volume controller to adjust the audio volume of the communication terminal in accordance with the communication network corresponding to the called number.

9. An apparatus for controlling volume of a mobile communication terminal performing a voice call via a first communication network or a second communication network, the apparatus comprising:

a memory to store first volume data corresponding to the first communication network and second volume data corresponding to the second communication network, the volume data including sending volume data and receiving volume data;

a communication network identifier to access the first communication network or the second communication network to make a voice call and to identify communication network information on the accessed communication network; and a volume converter to convert audio volume of the mobile communication terminal to the first volume data or the second volume data in accordance with the communication network information by referring to the memory, so that receiving audio volume and sending audio volume are equal.

10. The apparatus of claim 9, wherein the volume converter converts the audio volume to the first volume data if the communication network information is the first communication network, and converts the volume to the second volume data if the communication network information is the second communication network.

11. The apparatus of claim 9, wherein the first communication network is a 1X network and the second communication network is a 2G network.

* * * * *